United States Patent
Loftis et al.

(10) Patent No.: US 10,040,567 B2
(45) Date of Patent: Aug. 7, 2018

(54) AIRCRAFT NITROGEN GENERATION AND OXYGEN DISTRIBUTION

(71) Applicant: The Boeing Company, Chicago, IL (US)

(72) Inventors: Richard J. Loftis, Arlington, WA (US); Andrew L. Armatorio, Everett, WA (US); Colin W. Hart, Everett, WA (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 14/866,619

(22) Filed: Sep. 25, 2015

(65) Prior Publication Data
US 2017/0088282 A1    Mar. 30, 2017

(51) Int. Cl.
| | | |
|---|---|---|
| *B64D 33/00* | (2006.01) | |
| *B64D 13/02* | (2006.01) | |
| *B64D 37/32* | (2006.01) | |
| *B01D 53/00* | (2006.01) | |

(52) U.S. Cl.
CPC .............. *B64D 33/00* (2013.01); *B64D 13/02* (2013.01); *B64D 37/32* (2013.01); *B01D 53/00* (2013.01)

(58) Field of Classification Search
CPC ........ B64D 33/00; B64D 13/02; B64D 37/32; B64D 53/00
See application file for complete search history.

(56) References Cited

U.S. PATENT DOCUMENTS

| | | | | |
|---|---|---|---|---|
| 6,092,359 | A * | 7/2000 | Ackermann | B01J 10/007 60/783 |
| 8,801,831 | B1 * | 8/2014 | Snow, Jr. | A62C 3/06 244/135 R |
| 2003/0079463 | A1 * | 5/2003 | McKinney | F02K 9/78 60/204 |
| 2003/0233936 | A1 * | 12/2003 | Crome | A62B 7/14 95/96 |
| 2005/0247197 | A1 * | 11/2005 | Snow, Jr. | A62C 3/06 95/138 |

(Continued)

FOREIGN PATENT DOCUMENTS

EP    2803582 A2    11/2014

OTHER PUBLICATIONS

Search Report for related European Application No. EP16174099.8; dated Feb. 17, 2017.

*Primary Examiner* — Thomas G Black
*Assistant Examiner* — Sze-Hon Kong
(74) *Attorney, Agent, or Firm* — Miller, Matthias & Hull LLP

(57) ABSTRACT

Systems and methods provide for a nitrogen generation and oxygen distribution system. According to one aspect, the system includes an NGS and an oxygen distribution processor coupled to the NGS. The NGS creates nitrogen enriched air as the primary product for fuel tank use, and oxygen enriched air as a secondary product. The oxygen distribution processor is operative to determine a number of flight parameters, and from those parameters, provide an oxygen distribution command to an oxygen distribution valve in order to prevent the oxygen enriched air from being distributed, to route the oxygen enriched air to the ambient environment, or to route the oxygen enriched air to an aircraft engine to increase combustion efficiency.

26 Claims, 6 Drawing Sheets

(56) References Cited

U.S. PATENT DOCUMENTS

| | | | |
|---|---|---|---|
| 2005/0279208 A1* | 12/2005 | Schwalm | B01D 53/22 96/4 |
| 2007/0054610 A1* | 3/2007 | Jensen | B64D 37/32 454/74 |
| 2007/0062371 A1* | 3/2007 | Eilers | A62B 7/14 95/138 |
| 2007/0220896 A1* | 9/2007 | Varatharajan | F02C 1/002 60/772 |
| 2008/0173355 A1* | 7/2008 | Meckes | B64D 10/00 137/109 |
| 2009/0166358 A1* | 7/2009 | Bose | B01D 53/24 220/88.3 |
| 2010/0012116 A1* | 1/2010 | Rittner | A62B 7/08 128/202.26 |
| 2011/0062288 A1* | 3/2011 | Cremers | B64D 13/06 244/135 R |
| 2014/0230446 A1* | 8/2014 | Beutel | F01N 3/0864 60/773 |
| 2014/0331857 A1* | 11/2014 | Massey | B64D 37/32 95/8 |
| 2014/0342648 A1* | 11/2014 | Hart | B64D 13/06 454/76 |
| 2014/0344496 A1 | 11/2014 | Chan et al. | |
| 2015/0157883 A1 | 6/2015 | Armatorio et al. | |
| 2015/0157884 A1 | 6/2015 | Armatorio et al. | |
| 2016/0118679 A1* | 4/2016 | Joos | H01M 8/04559 429/415 |
| 2016/0206995 A1* | 7/2016 | Rugg | B01D 53/66 |
| 2016/0257419 A1* | 9/2016 | Artaud | A62C 3/08 |
| 2016/0346755 A1* | 12/2016 | DuBois | B01J 19/24 |
| 2016/0368614 A1* | 12/2016 | Endres | F02K 1/32 |

\* cited by examiner

AIRCRAFT NITROGEN GENERATION AND OXYGEN DISTRIBUTION

BACKGROUND

Aircraft often utilize a nitrogen generation system (NGS), or On Board Inert Gas Generation System, to provide nitrogen enriched air to the fuel tanks in order to render the tanks inert for safety purposes. A byproduct of an NGS is oxygen enriched air. This excess oxygen enriched air is commonly expelled to the ambient environment outside of the aircraft.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a nitrogen generation and oxygen distribution system, computer system and corresponding method. According to one aspect, a nitrogen generation and oxygen distribution system is provided. The system includes an NGS and an oxygen distribution processor coupled to the NGS. The NGS operates to create nitrogen enriched air as the primary product and oxygen enriched air as a secondary product, and to route the nitrogen enriched air to a fuel tank of an aircraft. The oxygen distribution processor is operative to determine a number of flight parameters, and from those parameters, select an oxygen distribution configuration associated with the NGS. In response to selecting a first oxygen distribution configuration, the oxygen distribution processor routes the oxygen enriched air from the NGS to an ambient environment surrounding the aircraft. In response to selecting a second oxygen distribution configuration, the oxygen distribution processor routes the oxygen enriched air from the NGS to an engine or engines of the aircraft.

According to another aspect, a nitrogen generation and oxygen distribution computer system is provided. The computer system includes an oxygen distribution processor coupled to an NGS of an aircraft. The computer system further includes an oxygen distribution application that, when executed by the oxygen distribution processor, causes the computer system to determine a number of flight parameters, and from those parameters, select an oxygen distribution configuration associated with the NGS. In response to selecting a first oxygen distribution configuration, the oxygen enriched air is routed from the NGS to an ambient environment surrounding the aircraft. In response to selecting a second oxygen distribution configuration, the oxygen enriched air is routed from the NGS to an engine of the aircraft.

According to yet another aspect, a computer-implemented method for distributing oxygen enriched air generated as a secondary product by an NGS of an aircraft is provided. The computer-implemented method includes determining a number of flight parameters and selecting an oxygen distribution configuration associated with the NGS from the flight parameters. In response to selecting a first oxygen distribution configuration, the oxygen enriched air is routed from the NGS to an ambient environment surrounding the aircraft. In response to selecting a second oxygen distribution configuration, the oxygen enriched air is routed from the NGS to an engine of the aircraft.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
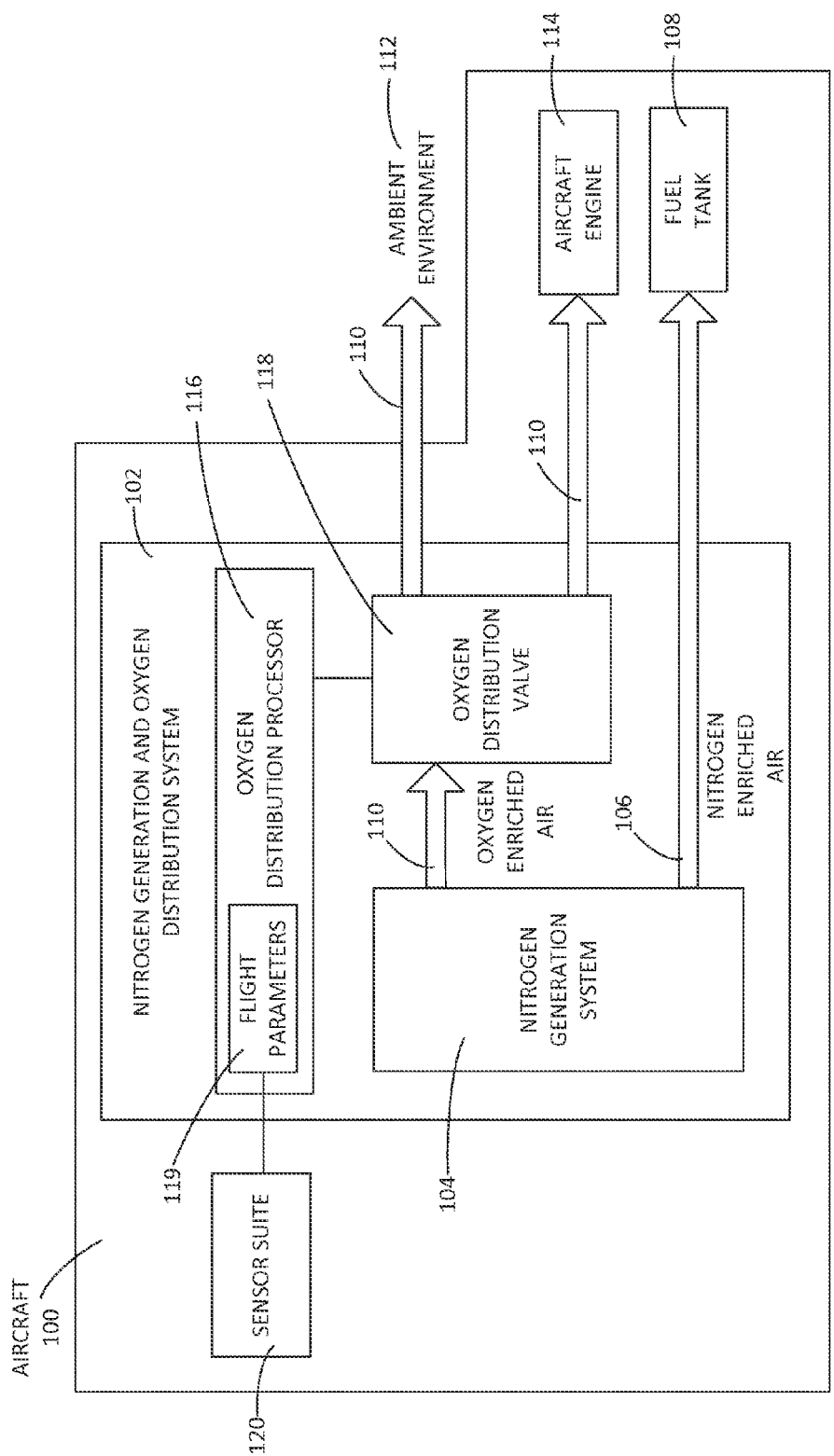
FIG. 1 is block diagram of a nitrogen generation and oxygen distribution system of an aircraft according to various embodiments described herein.

The following detailed description is directed to an aircraft nitrogen generation and oxygen distribution system, computer system, and method. As discussed above, aircraft commonly use nitrogen generation systems (NGSs) to produce nitrogen enriched air, which is then provided to the fuel tanks to create an inert environment within the tanks. Conventional NGSs produce oxygen enriched air as a secondary product, or byproduct, of the nitrogen production process. This oxygen enriched air is then vented overboard to the ambient atmosphere.

The aircraft industry is continuously striving for increased efficiency in all areas of operation. One area in which an increased efficiency may potentially have a significant economic impact is engine or fuel efficiency. Utilizing the concepts and technologies described herein, the oxygen enriched air produced by the NGS of an aircraft, which is typically vented to the ambient atmosphere, may be routed to one or more engines of the aircraft. An increased quantity of oxygen in the air entering the combustion chamber of the engine can increase the efficiency of the combustion process. According to various embodiments described below, an oxygen distribution processor makes dynamic routing decisions with respect to the oxygen enriched air produced by the NGS, directing the oxygen enriched air to the ambient environment, to one or more aircraft engines, or blocking the production of the oxygen enriched air altogether. The dynamic routing decisions are based on any number of flight parameters received or determined in real time. In doing so, the NGS operation and corresponding products may be utilized to not only provide an inert environment within the aircraft fuel tanks, but also to increase the operational efficiency of the aircraft engines.

In the following detailed description, references are made to the accompanying drawings that form a part hereof, and which are shown by way of illustration, specific embodiments, or examples. Referring now to the drawings, in which like numerals represent like elements through the several figures, a nitrogen generation and oxygen distribution system and method for employing the same according to the various embodiments will be described.

FIG. 1 shows a block diagram of nitrogen generation and oxygen distribution system 102 of an aircraft 100. The nitrogen generation and oxygen distribution system 102 includes the nitrogen generation system (NGS) 104 that produces the nitrogen enriched air 106 for the one or more fuel tanks 108 of the aircraft 100. The various components and corresponding operations of the NGS 104 are well known and are not material to this disclosure. However, the NGS 104 of the nitrogen generation and oxygen distribution system 102 is not merely a stand-alone system that produces nitrogen enriched air 106 per the conventional application of the NGS in a typical aircraft. Rather, the NGS 104 of the nitrogen generation and oxygen distribution system 102 is communicatively coupled to an oxygen distribution processor 116 and oxygen distribution valve 118. The oxygen distribution processor 116 is further communicatively coupled to a sensor suite 120 of the aircraft 100.

During operation of the nitrogen generation and oxygen distribution system 102 of various embodiments, the oxygen distribution processor 116 receives data from the sensor suite 120 of the aircraft 100 and interprets the data to determine where to distribute the oxygen enriched air 110 that is created as a secondary product by the NGS 104. The sensor suite 120 may include any number and type of sensors that alone or in combination may provide data interpreted by the oxygen distribution processor 116 to determine various flight parameters 119. The flight parameters 119 may include real-time aircraft or environmental characteristics, including, but not limited to, aircraft altitude, ambient pressure, ambient temperature, engine combustion chamber temperature, fuel flow, airflow into an engine, engine speed, and engine warnings. These flight parameters 119, as well as any additional or alternative environmental and/or aircraft data, may be interpreted to determine a phase of flight of the aircraft 100.

According to various embodiments described herein, the nitrogen generation and oxygen distribution system 102 will maintain maximum performance of the NGS 104 for fuel tank inerting purposes during selected flight phases. During these maximum NGS performance phases of flight, the nitrogen generation and oxygen distribution system 102 ensures that the oxygen enriched air 110 from the NGS 104 is vented to the ambient environment 112. Venting the oxygen enriched air 110 to the ambient environment 112 provides a pressure differential that facilitates the process of providing nitrogen enriched air 106 to the fuel tank 108. During the cruise phase of flight, the performance of the NGS 104 may be reduced without a significant consequence since the fuel tank 108 is inert and the NGS 104 is able to provide a reduced quantity of nitrogen enriched air 106 as fuel is consumed to sustain the inert status of the fuel tank 108. Accordingly, embodiments described herein provide for the oxygen distribution processor 116 to route the oxygen enriched air 110 from the NGS 104 to the aircraft engine 114. For the purposes of this disclosure, the aircraft engine 114 will be referred to in the singular form; however, it should be appreciated that the nitrogen generation and oxygen distribution system 102 may direct oxygen enriched air 110 to any number of aircraft engines 114.

The flight parameters 119 may additionally include performance criteria associated with the NGS 104. The performance criteria may include an operational state of the NGS 104, such as whether or not the NGS 104 is operating without fault or if a compressor acting on the output of the NGS 104 is operational. To protect the NGS 104 in the event of failure of the NGS or associated compressor, the oxygen distribution processor 116 will close the oxygen distribution valve 118 to prevent backflow into the NGS 104. This process will be illustrated and discussed further below.

Figure 2:
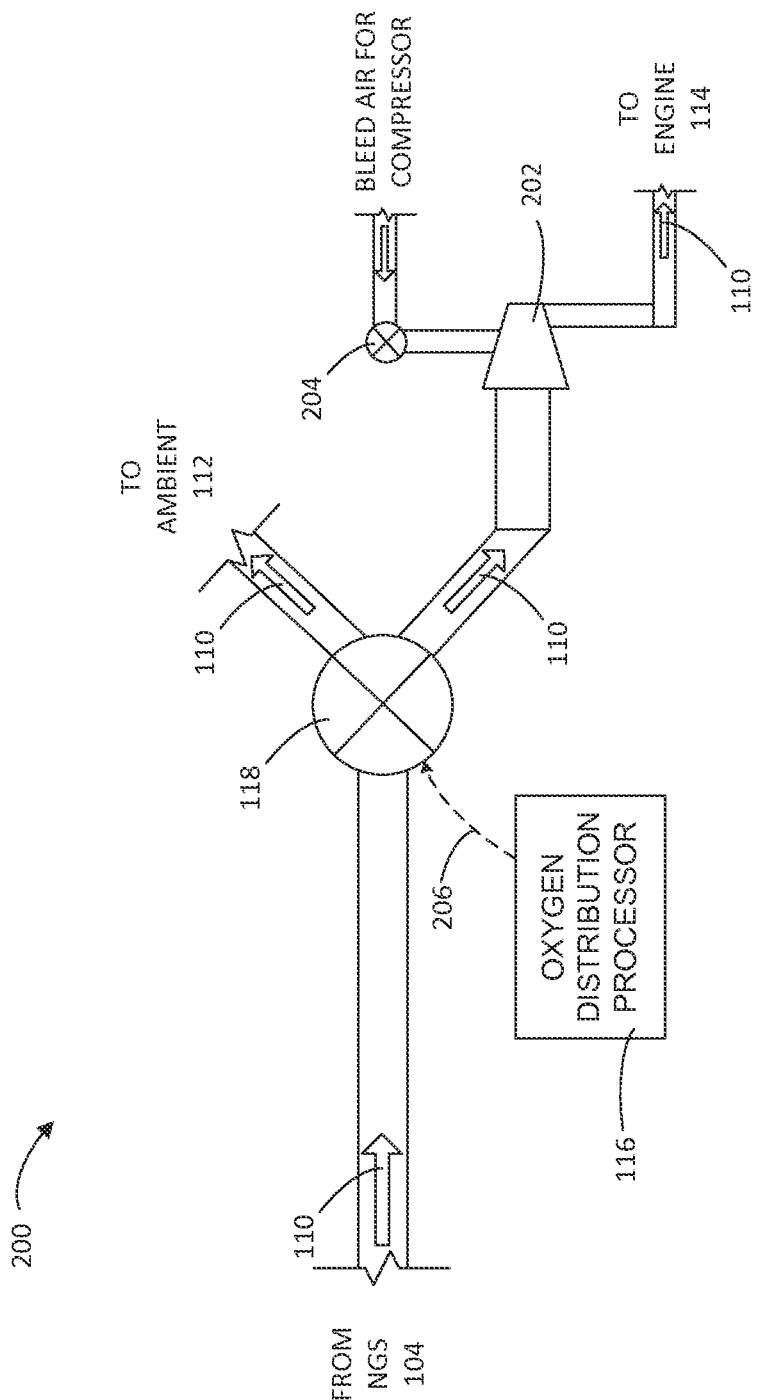
FIG. 2 is a schematic diagram illustrating the flow of oxygen enriched air through an oxygen distribution valve in an aircraft utilizing a pneumatic compressor according to various embodiments described herein.
Figure 3:
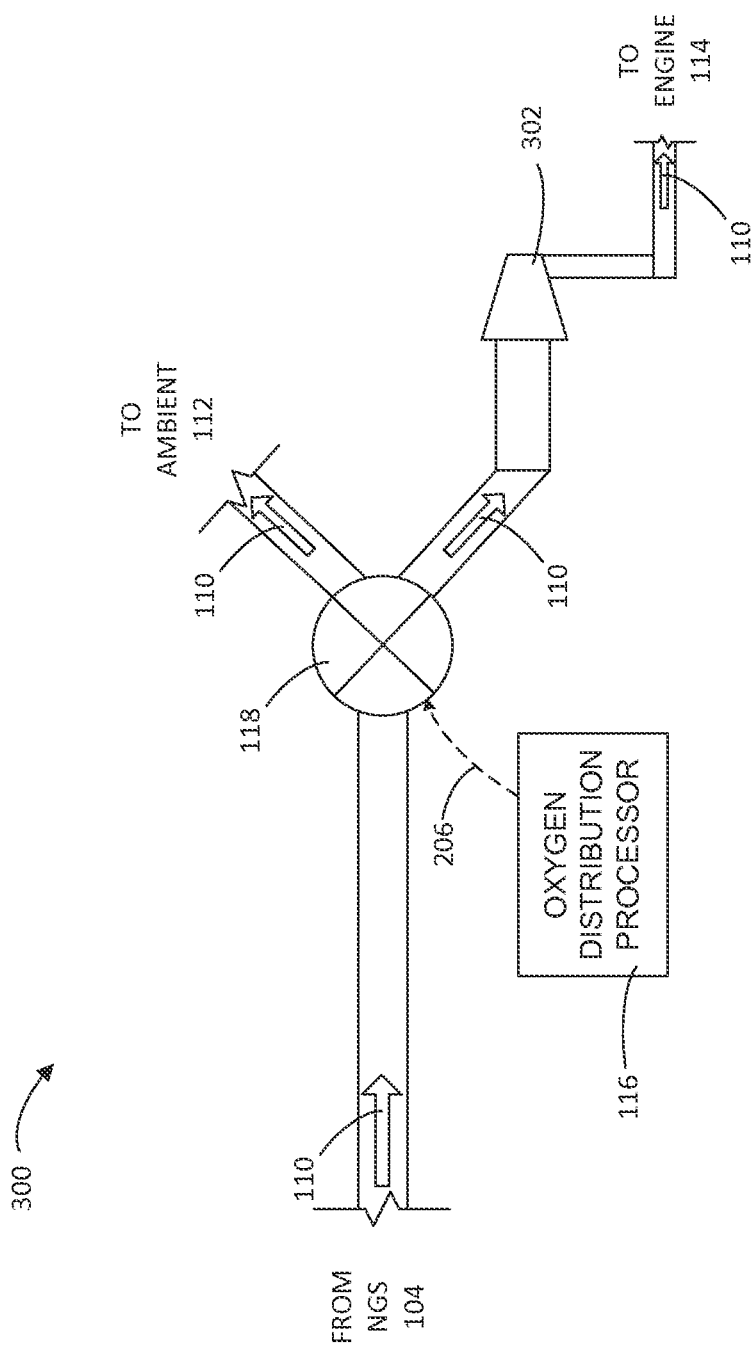
FIG. 3 is a schematic diagram illustrating the flow of oxygen enriched air through an oxygen distribution valve in an aircraft utilizing an electrically driven compressor according to various embodiments described herein.

Turning now to FIGS. 2 and 3, the operation of the oxygen distribution valve 118 will be discussed in further detail. FIG. 2 shows a schematic diagram 200 illustrating the flow of oxygen enriched air 110 through an oxygen distribution valve 118 in an aircraft 100 utilizing a pneumatic compressor 202. As shown in FIG. 2, the oxygen enriched air 110 flows from the NGS 104 to the oxygen distribution valve 118. The oxygen distribution valve 118 may be any type of suitable valve that is controllable via a signal sent by the oxygen distribution processor 116 to selectively provide one output path for the oxygen enriched air 110 while closing off other potential output paths. Examples include, but are not limited to, a butterfly valve, a gate valve, a ball valve, a globe valve, or any other suitable valve.

According to this example, the oxygen distribution valve 118 is configured to receive an oxygen distribution command 206 from the oxygen distribution processor 116 and to position the valve accordingly in one of three potential positions. Specifically, the oxygen distribution processor 116 controls the oxygen distribution valve 118 (1) to prevent any distribution of the oxygen enriched air 110, (2) to direct the oxygen enriched air 110 to the ambient environment 112, or (3) to direct the oxygen enriched air 110 to the aircraft engine 114. In the example shown in FIG. 2, the oxygen enriched air 110 flowing to the aircraft engine 114 flows through the pneumatic compressor 202 in order to provide the oxygen enriched air 110 to a high pressure area within the aircraft engine 114. In this example the pneumatic compressor 202 is powered by bleed air from the aircraft engine 114, which flows through a compressor shutoff valve 204. FIG. 3 shows a similar schematic diagram 300 as shown in FIG. 2; however, the compressor used in this example is an electrically driven compressor 302, which does not require the bleed air and corresponding compressor shutoff valve. It should be understood that while FIGS. 2 and 3 show pneumatically and electrically driven compressors, respectively, the disclosure herein is not limited to any particular type of compressor.

The examples discussed above with respect to FIGS. 2 and 3 include three potential positions for the oxygen distribution valve 118. It should be understood that according to alternative embodiments, the oxygen enriched air 110 may be distributed to alternative locations in addition to or alternatively to the aircraft engine 114. For example, the oxygen enriched air 110 may be directed to the aircraft cabin for pressurization purposes. In this and other implementations, the oxygen distribution processor 116 may determine the routing location for the oxygen enriched air 110 based on any number of pre-programmed factors or prioritizations.

Figure 4:
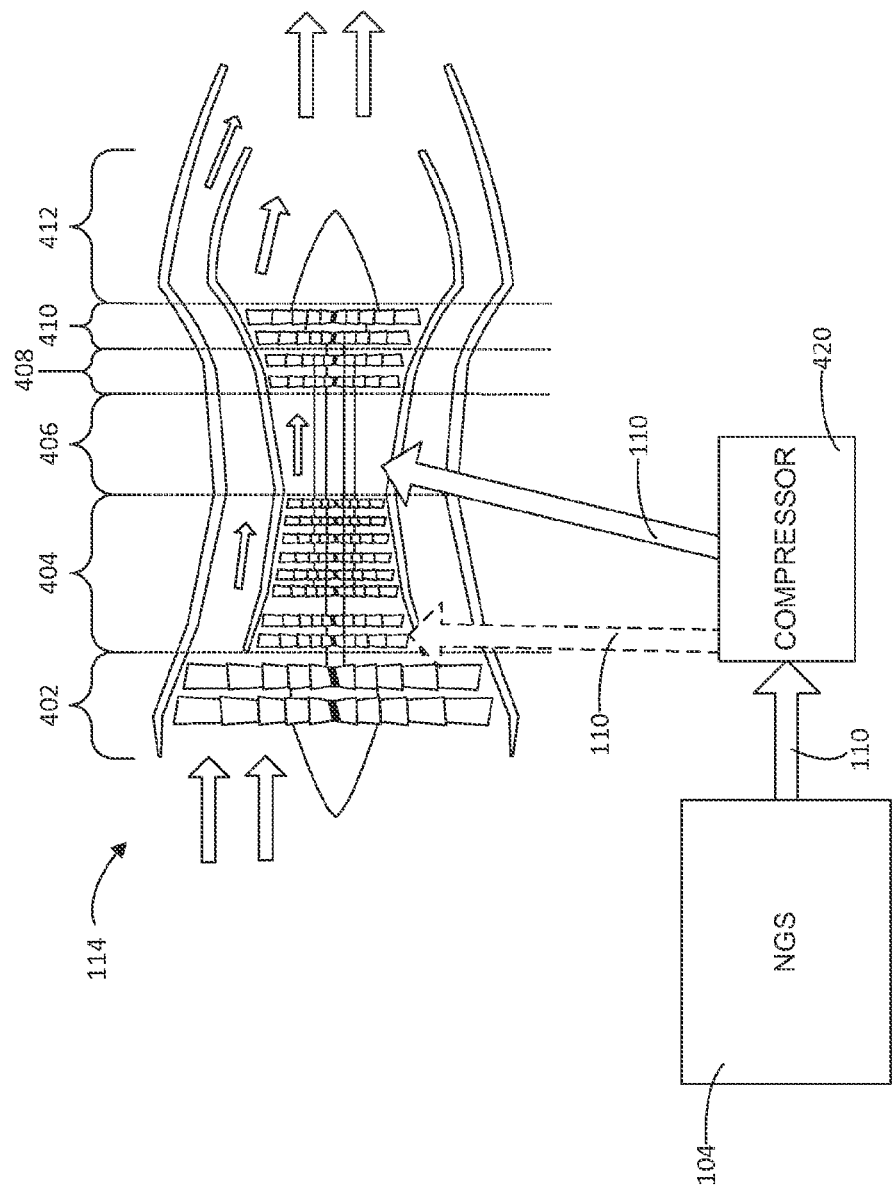
FIG. 4 is block diagram and cross-sectional view of a nitrogen generation and oxygen distribution system and aircraft engine showing oxygen distribution to the aircraft engine according to various embodiments described herein.

Referring now to FIG. 4, FIG. 4 shows a block diagram and cross-sectional view of a nitrogen generation and oxygen distribution system and aircraft engine 114 to illustrate oxygen distribution to the aircraft engine 114 according to various embodiments described herein. The aircraft engine 114 has been annotated to show various engine stages. In particular, the aircraft engine 114 includes a fan 402, a compressor section 404, a combustion chamber 406, a high-pressure turbine 408, a low-pressure turbine 410, and a nozzle 412. According to one embodiment, the oxygen enriched air 110 from the NGS 104 is injected or routed directly into the combustion chamber 406. In doing so, as discussed above, a compressor 420 may be used to provide the oxygen enriched air 110 at a suitable pressure. The compressor 420 may be the pneumatic compressor 202 or the electrically driven compressor 302.

According to an alternative embodiment, the oxygen enriched air 110 may be routed to the compressor section 404 upstream of the combustion chamber 406, as indicated by the broken arrow. For optimal efficiency purposes, the oxygen enriched air 110 should be utilized within the combustion chamber 406. Introducing the oxygen enriched air 110 farther upstream from the compressor section 404 may result in a portion of the oxygen enriched air 110 being bypassed around the combustion chamber 406, reducing the effects of the oxygen enriched air 110 distribution from the nitrogen generation and oxygen distribution system 102 into the aircraft engine 114.

In a typical high bypass engine, approximately 15% of the air entering the fan 402 travels through the combustion chamber 406. According to one embodiment, the oxygen enriched air of approximately 25-40% oxygen 110 entering the combustion chamber 406 from the nitrogen generation and oxygen distribution system 102 mixes with the air entering the combustion chamber 406 from the fan 402 of the aircraft engine 114 to produce a quantity of air being combusted that has a slightly elevated oxygen content due to the mass flow disparities between the NGS and engine. It should be clear from this disclosure that according to the embodiments discussed herein, the air being combusted within the combustion chamber 406 of the aircraft engine 114 includes an increased quantity of oxygen than the quantity of oxygen within the air entering entering the fan 402 of the aircraft engine 114. In addition to increasing the efficiency of the combustion process due to the oxygen enriched air 110, the introduction of the oxygen enriched air 110 means that less nitrogen is being burned. Less nitrogen being combusted results in fewer nitrogen oxides being produced, which reduces the potential for the creation of harmful smog.

Figure 5:
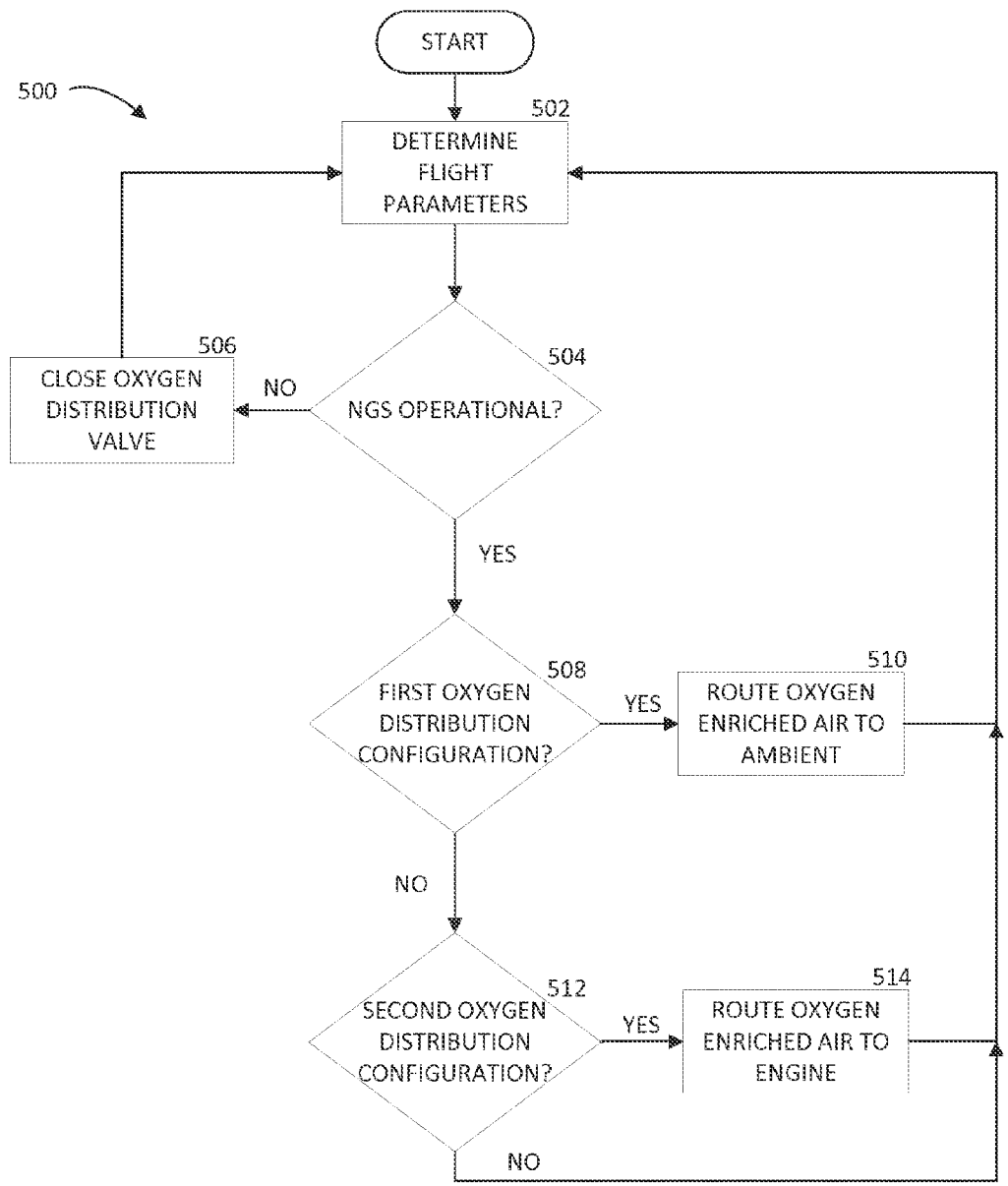
FIG. 5 is a flow diagram showing a method for distributing oxygen enriched air generated as a secondary product by a nitrogen generation system of an aircraft according to various embodiments described herein.

FIG. 5 shows a routine 500 for distributing oxygen enriched air 110 generated as a secondary product by an NGS 104 of an aircraft 100 according to various embodiments presented herein. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof It should also be appreciated that more or fewer operations may be performed than shown in the figures and described herein. These operations may also be performed in parallel, or in a different order than those described herein.

The routine 500 begins at operation 502, where the oxygen distribution processor 116 determines a number of flight parameters 119. These flight parameters 119 may be determined from data received from the sensor suite 120 of the aircraft 100. The flight parameters 119 may be used to determine a current phase of flight associated with the aircraft 100. From operation 502, the routine 500 continues to operation 504, where a determination is made as to whether or not the NGS 104 is operational. This determination may include whether or not the compressor 420 associated with the distribution of oxygen enriched air 110 to an aircraft engine 114 is operational. If the NGS 104 is not operational, then the oxygen distribution valve 118 is closed to prevent damage to the NGS 104 at operation 506, and the routine 500 returns to operation 502.

If the NGS 104 is operational at operation 504, then the routine 500 continues to operation 508, where a determination is made as to whether a selection of the first oxygen distribution configuration is appropriate. According to one embodiment, the first oxygen distribution configuration includes a configuration of the nitrogen generation and oxygen distribution system 102 in which a maximum quantity of nitrogen enriched air 106 is provided to the fuel tank 108 of the aircraft 100. Moreover, conditions other than the phase of flight may determine whether the first oxygen distribution configuration is appropriate. For example, ambient temperature, fuel tank conditions, flight plan or other conditions may determine the appropriate oxygen distribution configuration and NGS performance.

If a selection of the first oxygen distribution configuration is appropriate at operation 508, the routine 500 proceeds to operation 510, where the oxygen distribution processor 116 sends an oxygen distribution command 206 to the oxygen distribution valve 118 to route the oxygen enriched air 110 to the ambient environment 112, and the routine 500 returns to operation 502 and continues as described above. However, if the selection of the first oxygen distribution configuration is not appropriate at operation 508 due to the phase of flight or other flight parameter 119, the routine 500 continues to operation 512, where a determination is made as to whether a selection of the second oxygen distribution configuration is appropriate.

According to one embodiment, the second oxygen distribution configuration includes a configuration of the nitrogen generation and oxygen distribution system 102 in which less than a maximum quantity of nitrogen enriched air 106 is provided to the fuel tank 108 of the aircraft 100. Some quantity less than the maximum quantity of nitrogen enriched air 106 is provided to the fuel tank 108 when the oxygen enriched air 110 is provided to the aircraft engine 114 or other aircraft system rather than venting to the ambient environment 112. Moreover, conditions other than the phase of flight may determine whether the second oxygen distribution configuration is appropriate.

If a selection of the second oxygen distribution configuration is appropriate at operation 512, the routine 500 proceeds to operation 514, where the oxygen distribution processor 116 sends an oxygen distribution command 206 to the oxygen distribution valve 118 to route the oxygen enriched air 110 to the aircraft engine 114, and the routine 500 returns to operation 502 and continues as described above. However, if the selection of the second oxygen distribution configuration is not appropriate at operation 508 due to the phase of flight or other flight parameter 119, the routine 500 returns to operation 502, where the flight parameters 119 are determined, and the routine 500 continues as described above.

Figure 6:
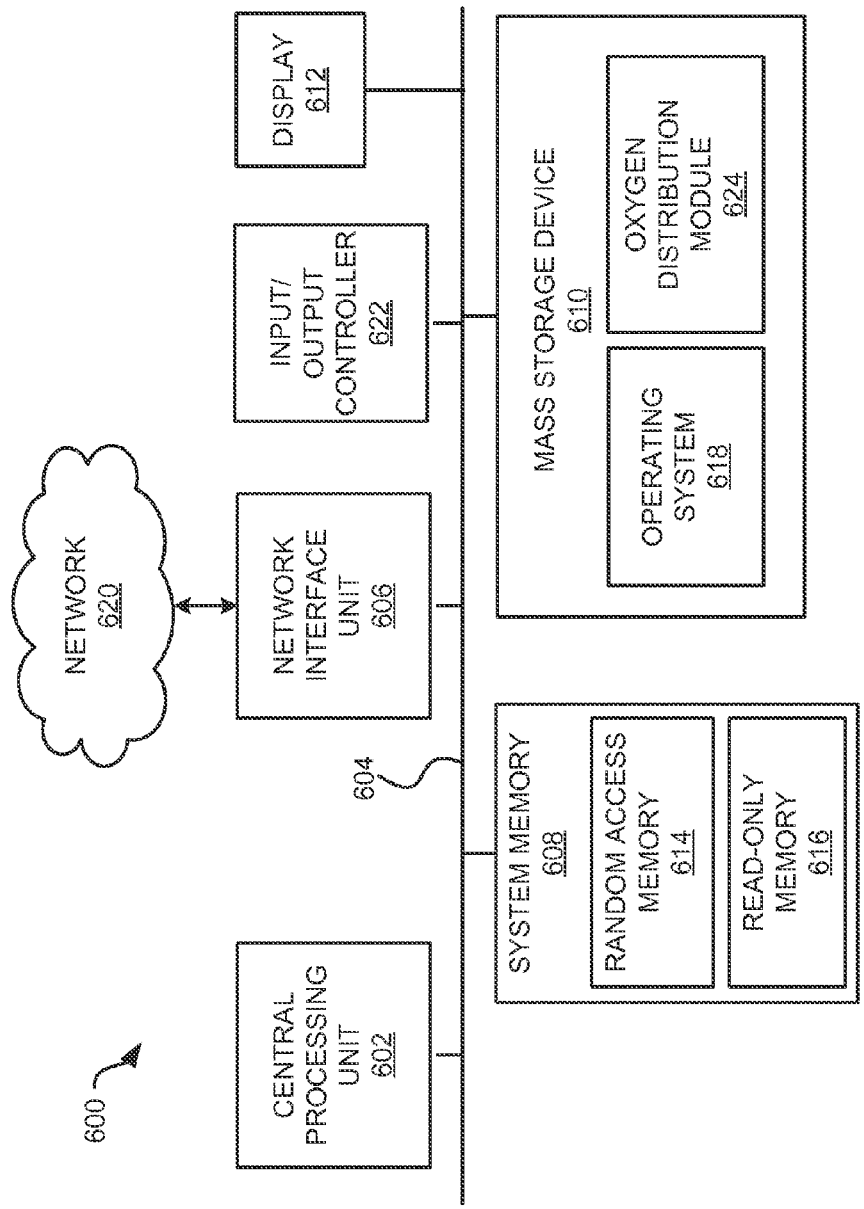
FIG. 6 is a computer architecture diagram showing various components of a nitrogen generation and oxygen distribution computer system according to various embodiments described herein.

FIG. 6 shows an illustrative computer architecture 600 of a nitrogen generation and oxygen distribution computer system described above, capable of executing the software components described herein for distributing oxygen enriched air 110 from the NGS 104 in the manner presented above. The computer architecture 600 includes a central processing unit 602 (CPU), a system memory 608, including a random access memory 614 (RAM) and a read-only memory 616 (ROM), and a system bus 604 that couples the memory to the CPU 602.

The CPU 602 is a standard programmable processor that performs arithmetic and logical operations necessary for the operation of the computer architecture 600. The CPU 602 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 600 also includes a mass storage device 610 for storing an operating or control system 618, as well as specific application modules or other program modules, such as an oxygen distribution module 624 operative to provide oxygen distribution commands 206 to the oxygen distribution valve 118 according to the various embodiments described above. The mass storage device 610 is connected to the CPU 602 through a mass storage controller (not shown) connected to the bus 604. The mass storage device 610 and its associated computer-readable media provide non-volatile storage for the computer architecture 600.

The computer architecture 600 may store data on the mass storage device 610 by transforming the physical state of the mass storage device to reflect the information being stored. The specific transformation of physical state may depend on various factors, in different implementations of this description. Examples of such factors may include, but are not limited to, the technology used to implement the mass storage device 610, whether the mass storage device is characterized as primary or secondary storage, and the like. For example, the computer architecture 600 may store information to the mass storage device 610 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 600 may further read information from the mass storage device 610 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 600. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 600.

According to various embodiments, the computer architecture 600 may operate in a networked environment using logical connections to other aircraft systems and remote computers through a network, such as the network 620. The computer architecture 600 may connect to the network 620 through a network interface unit 606 connected to the bus 604. It should be appreciated that the network interface unit 606 may also be utilized to connect to other types of networks and remote computer systems. The computer architecture 600 may also include an input-output controller 622 for receiving and processing input from a number of other devices, including a control display unit, a keyboard, mouse, electronic stylus, or touch screen that may be present on a connected display 612. Similarly, the input-output controller 622 may provide output to the display 612, a printer, or other type of output device.

Based on the foregoing, it should be appreciated that technologies for providing a nitrogen generation and oxygen distribution system 102, computer system, and method are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A nitrogen generation and oxygen distribution system, comprising:
a nitrogen generation system (NGS) operative to
create nitrogen enriched air as a primary product and oxygen enriched air as a secondary product, and
route the nitrogen enriched air to a fuel tank of an aircraft;
an oxygen distribution valve communicatively coupled to the NGS to receive the oxygen enriched air therefrom and selectively positionable to prevent any distribution of the oxygen enriched air from the NGS, to direct the oxygen enriched air from the NGS to an ambient environment surrounding the aircraft, or to direct the oxygen enriched air from the NGS to an engine of the aircraft; and
an oxygen distribution processor communicatively coupled to the NGS and to the oxygen distribution valve, and operative to
determine a plurality of flight parameters;
determine from the plurality of flight parameters, a selection of an oxygen distribution configuration associated with the NGS, the oxygen distribution configuration comprising a first oxygen distribution configuration, a second oxygen distribution configuration, and a third oxygen distribution configuration;
in response to determining the selection of the first oxygen distribution configuration, transmitting signals to the oxygen distribution valve to cause the oxygen distribution valve to route the oxygen enriched air from the NGS to the ambient environment surrounding the aircraft;

in response to determining the selection of the second oxygen distribution configuration, transmitting signals to the oxygen distribution valve to cause the oxygen distribution valve to route the oxygen enriched air from the NGS to the engine of the aircraft; and in response to determining the selection of the third oxygen distribution configuration, transmitting signals to the oxygen distribution valve to cause the oxygen distribution valve to close the oxygen distribution valve to prevent distribution of the oxygen enriched air to either the ambient environment or the engine of the aircraft.

2. The nitrogen generation and oxygen distribution system of claim 1, wherein determining the plurality of flight parameters comprises determining a plurality of real-time aircraft or environmental characteristics measured during a phase of flight.

3. The nitrogen generation and oxygen distribution system of claim 2, wherein determining the plurality of flight parameters comprises determining at least a current altitude, an ambient air pressure, and an ambient air temperature.

4. The nitrogen generation and oxygen distribution system of claim 2, wherein the first oxygen distribution configuration comprises a configuration in which a maximum quantity of nitrogen enriched air is provided to the fuel tank of the aircraft.

5. The nitrogen generation and oxygen distribution system of claim 4, wherein the phase of flight comprises a descent phase or climb phase of flight.

6. The nitrogen generation and oxygen distribution system of claim 4, wherein routing the oxygen enriched air from the NGS to the ambient environment surrounding the aircraft comprises positioning the oxygen distribution valve to prevent the oxygen enriched air from entering the engine of the aircraft and allow the oxygen enriched air to flow to the ambient environment.

7. The nitrogen generation and oxygen distribution system of claim 2, wherein the second oxygen distribution configuration comprises a configuration in which less than a maximum quantity of nitrogen enriched air is provided to the fuel tank of the aircraft.

8. The nitrogen generation and oxygen distribution system of claim 7, wherein the phase of flight comprises a cruise phase of flight.

9. The nitrogen generation and oxygen distribution system of claim 7, wherein routing the oxygen enriched air from the NGS to the engine of the aircraft comprises positioning the oxygen distribution valve to allow the oxygen enriched air to enter the engine of the aircraft and prevent the oxygen enriched air to flow to the ambient environment.

10. The nitrogen generation and oxygen distribution system of claim 9, wherein the oxygen enriched air is provided directly to a compressor of the engine.

11. The nitrogen generation and oxygen distribution system of claim 9, wherein the oxygen enriched air is provided directly to a combustion chamber of the engine.

12. The nitrogen generation and oxygen distribution system of claim 1, wherein the oxygen distribution processor is further operative to:

in response to determining the selection of the third oxygen distribution configuration, transmitting signals to the oxygen distribution valve to cause the oxygen distribution valve to close output paths between the NGS and the ambient environment and between the NGS and the engine.

13. A nitrogen generation and oxygen distribution computer system, comprising:

a nitrogen generation system (NGS) operative to create nitrogen enriched air as a primary product and oxygen enriched air as a secondary product, and to route the nitrogen enriched air to a fuel tank of an aircraft;

an oxygen distribution valve communicatively coupled to the NGS to receive the oxygen enriched air therefrom and selectively positionable to prevent any distribution of the oxygen enriched air from the NGS, to direct the oxygen enriched air from the NGS to an ambient environment surrounding the aircraft, or to direct the oxygen enriched air from the NGS to an engine of the aircraft;

an oxygen distribution processor communicatively coupled to the NGS and the oxygen distribution valve;

a memory communicatively coupled to the oxygen distribution processor; and an oxygen distribution application (i) which executes in the oxygen distribution processor and (ii) which, when executed by the oxygen distribution processor, causes the nitrogen generation and oxygen distribution computer system to determine a plurality of flight parameters;

determine from the plurality of flight parameters, a selection of an oxygen distribution configuration associated with the NGS, the oxygen distribution configuration comprising a first oxygen distribution configuration, a second oxygen distribution configuration, and a third oxygen distribution configuration;

in response to determining the selection of the first oxygen distribution configuration, transmitting signals from the oxygen distribution processor to the oxygen distribution valve to cause the oxygen distribution valve to route the oxygen enriched air from the NGS to the ambient environment surrounding the aircraft;

in response to determining the selection of the second oxygen distribution configuration, transmitting signals from the oxygen distribution processor to the oxygen distribution valve to cause the oxygen distribution valve to route the oxygen enriched air from the NGS to the engine of the aircraft, and in response to determining the selection of the third oxygen distribution configuration, transmitting signals from the oxygen distribution processor to the oxygen distribution valve to cause the oxygen distribution valve to close the oxygen distribution valve to prevent distribution of the oxygen enriched air to either the ambient environment or the engine of the aircraft.

14. The nitrogen generation and oxygen distribution computer system of claim 13, wherein causing the nitrogen generation and oxygen distribution computer system to determine the plurality of flight parameters comprises causing the nitrogen generation and oxygen distribution computer system to determine a plurality of real-time aircraft or environmental characteristics measured during a phase of flight.

15. The nitrogen generation and oxygen distribution computer system of claim 14, wherein the first oxygen distribution configuration comprises a configuration in which a maximum quantity of nitrogen enriched air is provided to a fuel tank of the aircraft.

16. The nitrogen generation and oxygen distribution computer system of claim 14, wherein the second oxygen distribution configuration comprises a configuration in which less than a maximum quantity of nitrogen enriched air is provided to a fuel tank of the aircraft.

17. The nitrogen generation and oxygen distribution computer system of claim 16, wherein causing the nitrogen generation and oxygen distribution computer system to route the oxygen enriched air from the NGS to the engine of the aircraft comprises causing the nitrogen generation and oxygen distribution computer system to route the oxygen enriched air from the NGS to a compressor of the engine.

18. The nitrogen generation and oxygen distribution computer system of claim 16, wherein causing the nitrogen generation and oxygen distribution computer system to route the oxygen enriched air from the NGS to the engine of the aircraft comprises causing the nitrogen generation and oxygen distribution computer system to route the oxygen enriched air from the NGS to a combustion chamber of the engine.

19. The nitrogen generation and oxygen distribution computer system of claim 13, wherein the oxygen distribution application further causes the nitrogen generation and oxygen distribution computer system to:
in response to determining the selection of the third oxygen distribution configuration, transmitting signals from the oxygen distribution processor to the oxygen distribution valve to cause the oxygen distribution valve to close output paths between the NGS and the ambient environment and between the NGS and the engine.

20. A computer-implemented method for distributing oxygen enriched air generated as a secondary product by a nitrogen generation system (NGS) of an aircraft, the computer-implemented method comprising:
determining a plurality of flight parameters;
determining from the plurality of flight parameters, a selection of an oxygen distribution configuration associated with the NGS, the oxygen distribution configuration comprising a first oxygen distribution configuration, a second oxygen distribution configuration, and a third oxygen distribution configuration;
in response to determining the selection of the first oxygen distribution configuration, causing an oxygen distribution valve to route the oxygen enriched air from the NGS to an ambient environment surrounding the aircraft;
in response to determining the selection of the second oxygen distribution configuration, causing the oxygen distribution valve to route the oxygen enriched air from the NGS to an engine of the aircraft, and
in response to determining the selection of the third oxygen distribution configuration, closing the oxygen distribution valve to prevent distribution of the oxygen enriched air to either the ambient environment or the engine of the aircraft.

21. The computer-implemented method of claim 20, wherein determining the plurality of flight parameters comprises determining a plurality of real-time aircraft or environmental characteristics measured during a phase of flight.

22. The computer-implemented method of claim 21, wherein the first oxygen distribution configuration comprises a configuration in which a maximum quantity of nitrogen enriched air is provided to a fuel tank of the aircraft.

23. The computer-implemented method of claim 21, wherein the second oxygen distribution configuration comprises a configuration in which less than a maximum quantity of nitrogen enriched air is provided to a fuel tank of the aircraft.

24. The computer-implemented method of claim 20, the method further comprising:
in response to selecting the third oxygen distribution configuration, causing the oxygen distribution valve to close output paths between the NGS and the ambient environment and between the NGS and the engine.

25. A nitrogen generation and oxygen distribution system, comprising:
a nitrogen generation system (NGS) operative to
create nitrogen enriched air as a primary product and oxygen enriched air as a secondary product, and
route the nitrogen enriched air to a fuel tank of an aircraft; and
an oxygen distribution processor communicatively coupled to the NGS and operative to
determine a plurality of flight parameters comprising determining a plurality of real-time aircraft or environmental characteristics measured during a phase of flight;
determine from the plurality of flight parameters, a selection of an oxygen distribution configuration associated with the NGS, the oxygen distribution configuration comprising a first oxygen distribution configuration and a second oxygen distribution configuration, the second oxygen distribution configuration comprising a configuration in which less than a maximum quantity of nitrogen enriched air is provided to the fuel tank of the aircraft;
in response to selecting the first oxygen distribution configuration, route the oxygen enriched air from the NGS to an ambient environment surrounding the aircraft; and
in response to selecting the second oxygen distribution configuration, route the oxygen enriched air from the NGS to a compressor of an engine of the aircraft, and position a shut-off valve to allow the oxygen enriched air to enter the compressor of the engine of the aircraft and prevent the oxygen enriched air to flow to the ambient environment.

26. A nitrogen generation and oxygen distribution computer system, comprising:
an oxygen distribution processor communicatively coupled to a nitrogen generation system (NGS) of an aircraft;
a memory communicatively coupled to the oxygen distribution processor; and
an oxygen distribution application (i) which executes in the oxygen distribution processor and (ii) which, when executed by the oxygen distribution processor, causes the nitrogen generation and oxygen distribution computer system to
determine a plurality of flight parameters comprising cause the nitrogen generation and oxygen distribution computer system to determine a plurality of real-time aircraft or environmental characteristics measured during a phase of flight;
determine from the plurality of flight parameters, a selection of an oxygen distribution configuration associated with the NGS, the oxygen distribution configuration comprising a first oxygen distribution configuration and a second oxygen distribution configuration, the second oxygen distribution configuration comprising a configuration in which less than a maximum quantity of nitrogen enriched air is provided to a fuel tank of the aircraft;

in response to selecting the first oxygen distribution configuration, route the oxygen enriched air from the NGS to an ambient environment surrounding the aircraft; and in response to selecting the second oxygen distribution configuration, route the oxygen enriched air from the NGS to a compressor of an engine of the aircraft.

* * * * *